United States Patent

[11] 3,626,986

| [72] | Inventors | Hermann Rapp<br>Aarburg;<br>Walter Allenspach, Niederuzwil, both of<br>Switzerland |
|---|---|---|
| [21] | Appl. No. | 859,539 |
| [22] | Filed | Sept. 19, 1969 |
| [45] | Patented | Dec. 14, 1971 |
| [73] | Assignee | Gebruder Buhler AG<br>Uzwill, Switzerland<br>Continuation-in-part of application Ser. No. 646,401, June 15, 1967, now Patent No. 3,524,478, dated Aug. 18, 1970. This application Sept. 19, 1969, Ser. No. 859,539 |

[54] PIPELINE CONSTRUCTION FOR PNEUMATIC AND HYDRAULIC CONVEYANCE OF SOLID MATERIAL
10 Claims, 4 Drawing Figs.

[52] U.S. Cl. .................................................... 138/111,
302/64, 138/115, 138/116
[51] Int. Cl. ..................................................... G05d 11/00
[50] Field of Search ........................................... 302/64;
137/625.4, 625.44; 138/111, 115, 116

[56] References Cited
UNITED STATES PATENTS

| 1,628,738 | 5/1927 | Olness ........................... | 137/625.44 |
| 3,524,478 | 8/1970 | Rapp et al ..................... | 138/111 |

FOREIGN PATENTS

| 459,060 | 8/1968 | Switzerland .................. | 302/64 |

*Primary Examiner*—Harvey C. Hornsby
*Assistant Examiner*—Merle F. Maffei
*Attorney*—McGlew and Toren

ABSTRACT: Pipe sections, for use in constructing pipelines for conveying solid particles of material either pneumatically or hydraulically, are formed by a main conduit and a branch conduit. At least a portion of the branch conduit is made up of tubular members separate from the main conduit. Openings are provided in the main conduit and branch conduit for interconnecting their flow passageways and a web section is located within the branch conduit for directing the flow of material between the two passageways.

PIPELINE CONSTRUCTION FOR PNEUMATIC AND HYDRAULIC CONVEYANCE OF SOLID MATERIAL

This is a continuation-in-part of application Ser. No. 646,401, filed June 15, 1967, now U.S. Pat. No. 3,524,478, issued Aug. 18, 1970.

SUMMARY OF THE INVENTION

The present invention is directed to a pipeline for conveying solid material and, more particularly, to a conveyor line divided into a main conduit and a branch conduit having openings therebetween and with at least a portion of the branch conduit being formed of a tubular member separate from the main conduit.

One of the characteristic features of the present invention is the disposition of inlet and outlet openings between the main and branch conduits and the provision of a web section disposed in the branch conduit for directing the flow of materials between the two conduits.

In German Pat. No. 1,174,256, a method is disclosed for the automatic separation of a column of granular or powdered material which is conveyed through a pipeline by pneumatic or hydraulic means. The particles of materials being conveyed are relatively short and of almost equal length.

The above patent, in addition to setting forth a method, also discloses apparatus for carrying out the method. However, the apparatus suggested has certain disadvantages. The adaptation of the pipeline to meet various problems which arise in the transport of certain materials is possible, but only at considerable expense. With the suggested apparatus, which appears to be easily exchangeable, installations have been provided in a conveyor pipeline resulting in considerable blockage or jamming of the particles being transported, which occurs even with particles of a very finely powdered nature. Moreover, the problems that arise are especially noticeable if supporting webs are used which extend transversely of the conveyor pipes and across the flow of the material. In well-known pneumatic methods of conveying material, this obstructing effect is particularly noticeable and is magnified as the deadweight of the conveying medium increases. Accordingly, under such circumstances, this new method and apparatus of conveying material becomes substantially less economical. In the arrangement set forth in the present invention, these various disadvantages are overcome.

Accordingly, it is a primary object of the present invention to provide a main conduit and a branch conduit disposed in coextending relationship for conveying solid material in particle form with at least a portion of the branch conduit being formed of a tubular member separate from the main conduit.

Another object of the invention is to provide an arrangement wherein the main conduit and the branch conduit are formed of separate members for their entire length with means for interconnecting the conduits and for directing flow between the passageways formed by the two conduits.

Still another object of the invention is to provide an arrangement employing flexible piping for the branch conduits with the flexible piping secured to branch chambers mounted on the main conduits. An opening is provided through the main conduit at the location of the branch conduit to afford flow between the passageways defined by the two conduits.

Moreover, another object of the present invention is to provide a web section within the branch conduit at the point at which the two passageways are in communication for directing flow therebetween.

A further object of the invention is to provide a pipeline construction in which bends can be easily produced.

A still further object of the present invention is to provide a pipeline which can be assembled easily and which is adapted to incorporate standardized sections between the points of interconnection between the main conduit and the branch conduit.

Therefore, the present invention is directed to a pipe section utilizing either hydraulic or pneumatic means for conveying solid particles of material. The pipe section is made up of a main conduit and a branch conduit arranged in substantially coextending relationship. For at least a portion of its length, the branch conduit is formed by a tubular member separate from the main conduit. At spaced locations along the length of the pipe section, openings are provided between the main conduit and the branch conduit with a web member positioned within the branch conduit at the opening for directing the flow of material between the two passageways formed by the conduits.

In one embodiment of the present invention the main conduit and branch conduit are formed of separate tubular members for their entire length with longitudinally spaced aligned openings in the two conduits for affording flow between them. At the location of the common openings the main conduit and branch conduit are arranged in sealed engagement.

In another embodiment of the invention branch chambers are formed on the exterior of the main conduit at the location of openings from the main conduit. Inlet and output connections are provided on the branch chamber to which flexible or rigid tubular sections can be attached to complete the branch conduit.

Moreover, another embodiment of the invention employs a separate tubular section in the branch conduit for diverting the flow through the branch conduit about obstructions formed by the structure of the main conduit and the like.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
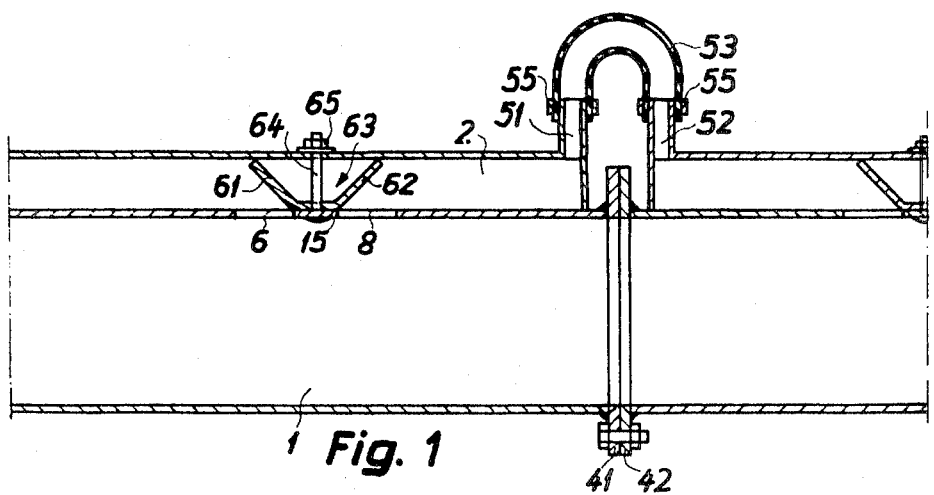
FIG. 1 is a longitudinal sectional view of one embodiment of a pipe section disclosing the present invention.

In FIG. 1, a pipeline is formed of a main conduit 1 and a branch conduit 2. The main conduit is formed of a plurality of pipe sections C connected together by means of flanges 41, 42.

The branch conduit 2 is formed of a channel shaped member mounted on the exterior of the main conduit and combining with the main conduit to form the branch passageway.

Openings 6, 8 spaced apart by a web 15 are disposed at longitudinally spaced locations along the portion of the main conduit 1 which combines with the branch conduit to form the branch passageway. Within the branch conduit a web 63, having a V-shaped configuration in the longitudinal direction of the pipeline, forms an obstacle in the passageway through the branch conduit so that openings 6, 8 form exit and entrance apertures between the branch conduit and the main conduit.

The web section 63 rests on the web 15 and is claimed in tightly fitting engagement with the wall member of the branch conduit by means of a bolt 64 and a nut 65 positioned on the outer surface of the branch conduit. By tightening the nut 65 on the bolt 64, the legs 61, 62 of the web section 63 are forced into engagement against the inner surface of the branch conduit.

Due to the position of the flanges 41, 42 in the path of the branch conduit it is not possible to effect the continuation of the branch conduit unless, as indicated in FIG. 1, a bypass is provided for the branch conduit about the flanges. At the ends of the branch conduit wall members 2, 2 a pair of pipe sections 51, 52, respectively, are secured in part to the outer surface of the main conduit and in part to the branch conduit wall members, and form passageways extending normally to the axes of the conduits. A U-shaped pipe 53 is secured at its ends to the pipes 51, 52 by means of clamps 55 to provide a continuous passageway for the branch conduit 2 about the flanges which connect adjoining sections of the main conduit.

This arrangement has the advantage of easy assembly and disassembly of the pipeline for purposes of control.

Figure 2:
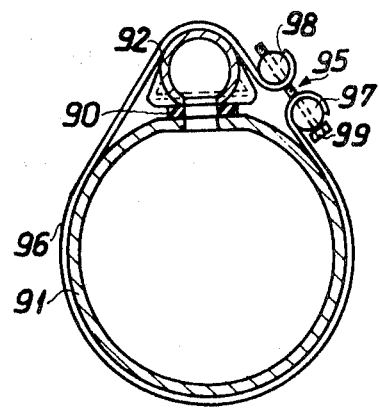
FIG. 2 is a transverse sectional view illustrating another embodiment of the present invention.
Figure 3:
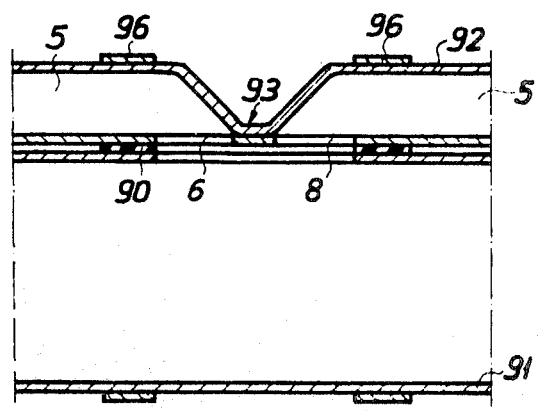
FIG. 3 is a longitudinal sectional view of the pipe section shown in FIG. 2.

In FIG. 1, only a portion of the branch conduit, that is, the bypass section, is formed of a tubular member separate from the pipe sections making up the main conduit. However, in FIGS. 2 and 3, an arrangement is shown where a pair of closed tubular sections combine to provide the pipeline. The main conduit is formed by a pipe 91 and the branch conduit is formed by a smaller pipe 92 disposed in coextending parallel relationship with the pipe 91. As shown, the pipe 92 is mounted along the crown of the pipe 91. Openings 6, 8 are provided through the respective main and branch conduits in registry with one another to afford flow between the two conduits. Disposed about the openings 6, 8 is a sealing material 90 to effect a gastight closure at the location of the openings. At its opening 6, the pipe 92 is deformed to provide a V-shaped web section 93, see FIG. 3, which forms a barrier across the branch conduit at the opening 6 and divides into an exit aperture 8 and an entrance aperture 8. As can be seen in FIG. 3, the lower edge or apex of the web section 93 rests on the lower portion of the pipe 92 which divides the opening into the two separate apertures.

The pipes 91, 92 are secured together by a tensioning device which comprises flexible bands 96 extending around the outer surface of the pipe 91 and passing over the upper surface of the pipe 91. At each of its ends, the band has a U-shaped or hooked portion holding a pin 97, 98. One of the pins 97 has a smooth bore and the other pin 98 has a threaded bore. A locking bolt 95 having a head 99 extends through the pin 97 and is threaded into the bore of pin 98. By threading the locking bolt into the pin 98, the band is tightened about the pipes 91, 92 and the two pipes are forced together so that a gastight joint is obtained at the openings 6, 8 by means of the sealing material 90.

In this construction, the pipe 92, which is separated by web sections 93 into individual passageways 5 provides a self-contained passageway separate from the pipe 91. There is no common wall between the branch conduit and the main conduit. Accordingly, this construction is particularly adaptable for temporary pipelines. All that is required to establish a pipeline is to clamp the suitably perforated pipes together thereby forming a main conduit and an intercommunicating branch conduit.

Figure 4:
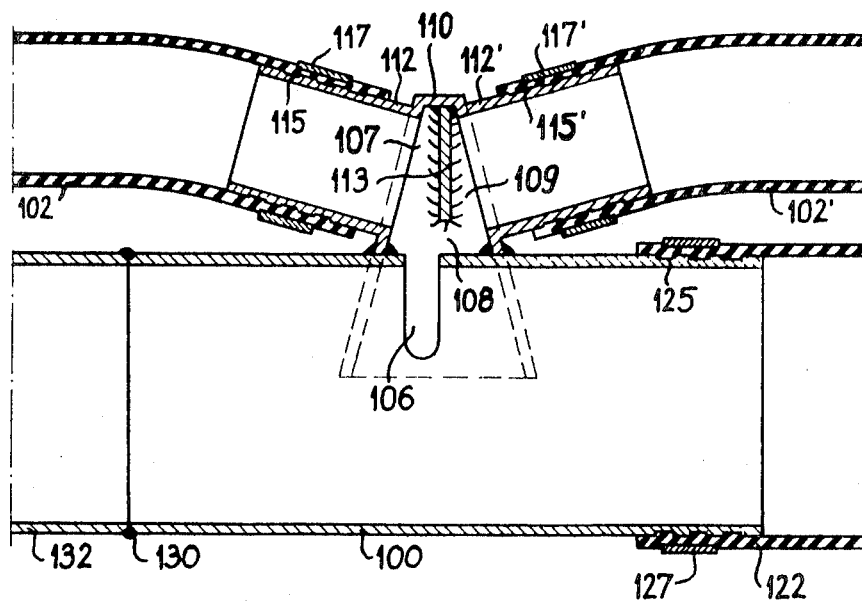
FIG. 4 is a longitudinal sectional view of still another embodiment of the present invention.

In FIG. 4, a portion of the main conduit is formed by a pipe section 100 having a circumferentially extending slot 106 formed in the upper portion of the pipe section. Enclosing the slot 106 is a branch chamber 110 which is fixed to the exterior of the pipe section 100 in sealed engagement. A web or dividing wall 113, positioned within the branch chamber 110 divides it into two subchambers 107, 109. The web 113 is secured to the radially outer walls within the branch chamber and extends inwardly toward but is spaced from the outer surface of the pipe section 100, forming an aperture 108 interconnecting the subchambers 107, 109 and permitting each of the subchambers to be in communication with the main conduit through the slot 106.

On the opposite sides of the branch chamber 110, extending in the axial direction of the main conduit 1, are duct connections 112, 112'. Extending circumferentially about the duct connections 112, 112' are axially spaced grooves 115, 115', respectively. The branch conduit is formed of flexible duct sections 102, 102' which fit over the duct connections 112, 112' and are fastened to them by means of clamping collars 117, 117' which force the flexible ducts into the grooves 115, 115' to assure a closely held fluidtight connection.

In the main conduit 1, at the left end of the pipe section 100 as viewed in FIG. 4, a rigid pipe section 132 is secured to it by means of a circumferential weld 130. At the opposite end of the pipe section 100 a flexible pipe section 122 is fitted over the end of the pipe section 100, in the same manner as shown for the connection of the pipe sections 102, 102' to the duct connections in the branch conduit. Circumferentially extending grooves 125 are formed on the exterior of the pipe section 100 near its right end and a clamping collar 127 forces the flexible pipe section 122 into fluidtight engagement with the pipe section. As is evident from this arrangement, either rigid or flexible pipe sections can be secured to the pipe section 100 for forming the main conduit 1, based on the characteristics of the pipeline.

Further, the duct or pipe section forming the branch conduit may also be formed of either rigid or flexible duct sections. If rigid duct sections are used in place of the clampings collar shown in FIG. 4, the rigid duct sections could be welded to the duct connections 112, 112'.

The embodiment of the invention shown in FIG. 4 has a number of advantages:

1. Either or both the main conduit and the branch conduit can be made up of flexible sections, an arrangement which affords easy assembly.
2. The flexibility of the components of the main conduit and the branch conduit make it especially adaptable to pipelines having many bends.
3. This arrangement can be easily adapted to the properties of the product to be conveyed through the conduits.
4. The pipe section and branch chamber for interconnecting the branch conduits and the main conduit can be formed as a single element for ease in the assembly of the pipeline.

We claim:

1. A pipe section, for use in material handling apparatus, for conveying solid bulk material in particle form in a pneumatic or hydraulic medium, said pipe section comprising, in combination, a longitudinally extending main conduit forming a main passageway for conveying solid material therethrough; a longitudinally extending branch conduit forming a branch passageway disposed in coextending relation with said main passageway; said main conduit and said branch conduit having at least one common opening establishing communication between said main passageway and said branch passageway and spaced longitudinally from any other common openings in the pipe section; a tubular section, closed circumferentially independently of said main conduit, forming at least a portion of said branch conduit; and web-forming means within said branch conduit at the location of said common opening and providing a web extending transversely across at least a portion of the flow area of said branch passageway to direct the flow of material between said main conduit and said branch conduit; at least a portion of said web-forming means being located at that portion of the periphery of said branch passageway adjoining the periphery of said main passageway.

2. A pipe section, as set forth in claim 1, in which said main conduit has an aperture therethrough constituting said common opening; said web-forming means including wall means secured to the exterior of said main conduit and defining a branch chamber communicating with said main conduit through the aperture; said wall means being formed with a pair of oppositely disposed openings of said branch chamber; and respective separate tubular members secured to said wall means at each of the openings of said branch chamber and communicating therewith through said openings; said separate tubular members forming, in combination with said branch chamber, said branch passageway coextending with said main passageway; said web being located within said branch chamber.

3. A pipe section, as set forth in claim 1, wherein a longitudinally extending first tubular member forms said main conduit, and a longitudinally extending second tubular member disposed in approximately parallel relationship with said first tubular member forms said branch conduit, said first tubular member and said second tubular member having aligned openings through their surfaces for forming the common opening communicating between the passageways in said conduits.

4. A pipe section, as set forth in claim 3, wherein sealing means are disposed between said first and second tubular members at the location of the aligned openings communicating therebetween for forming a fluidtight joint therebetween.

5. A pipe section, as set forth in claim 4, wherein a band encircles said first and said second tubular members, and means for tensioning said band are operatively engaged with it for mechanically securing said first and said second tubular members together.

6. A pipe section, as set forth in claim 3, wherein the walls of said second tubular member are deformed to form a V-shaped baffle at the location of the openings communicating between said first and second tubular members with the apex of said V-shaped baffle directed toward the opening from said second tubular member.

7. A pipe section, as set forth in claim 1, wherein said portion of said branch conduit formed of a closed tubular section separate from said main conduit comprises, in at least one location in the longitudinal direction of said branch conduit, wall means extending transversely across the axis of said branch conduit and forming a barrier against continuous axial flow through said branch conduit, and a separate bypass conduit secured at its opposite ends to said branch conduit on each side of said wall means for forming a bypass flow path about the barrier in said branch conduit.

8. A pipe section, as set forth in claim 2, clamp means on said tubular members for attaching said tubular sections to said tubular members.

9. A pipe section, as set forth in claim 8, wherein said tubular sections comprise flexible sections, said tubular members having circumferentially extending grooves formed in the exterior thereof so that said clamp means forces said flexible sections into fluid tight engagement within the grooves in said tubular members.

10. A pipe section, as set forth in claim 2, wherein said web divides said branch chamber into a pair of subchambers, and the edge of said web adjacent said main conduit is spaced outwardly from said main conduit for admitting flow between said subchambers and the aperture communicating with said main conduit.

* * * * *